Aug. 27, 1935. P. ZOLOTAS 2,012,702
BARBECUE APPARATUS
Filed Nov. 16, 1931  2 Sheets-Sheet 1
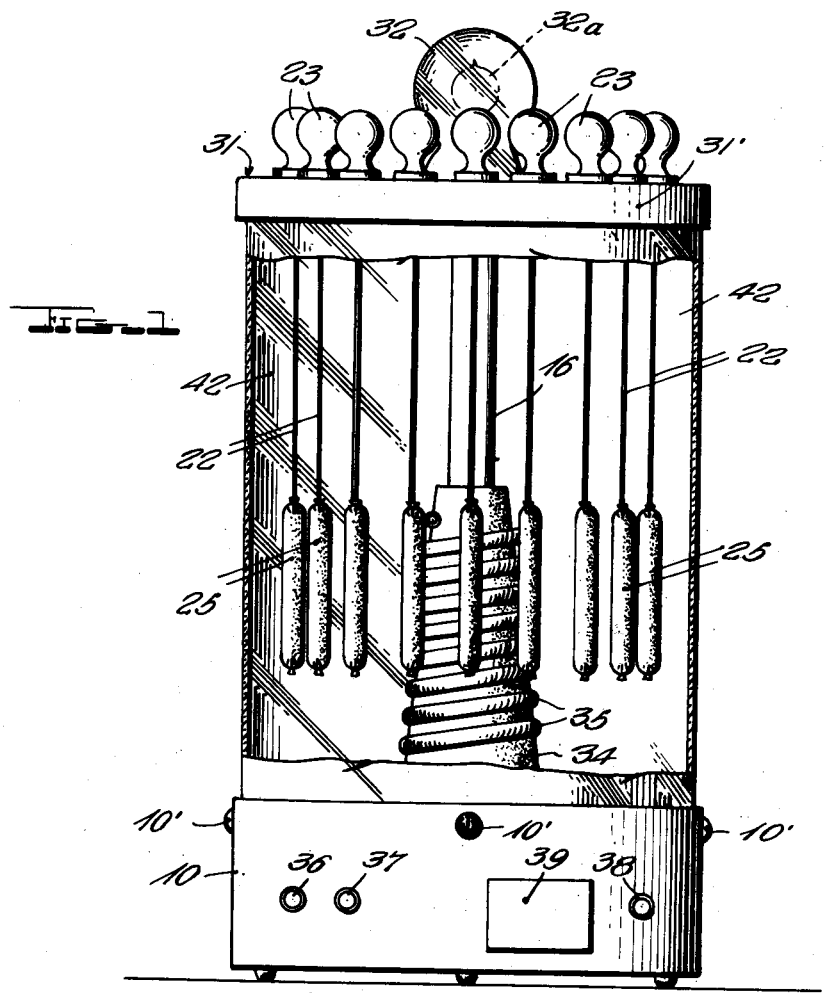
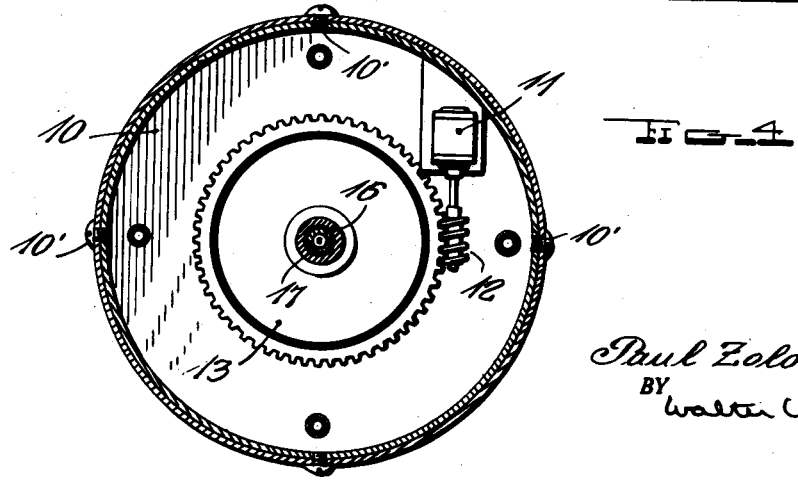
INVENTOR.
Paul Zolotas,
BY
ATTORNEY.

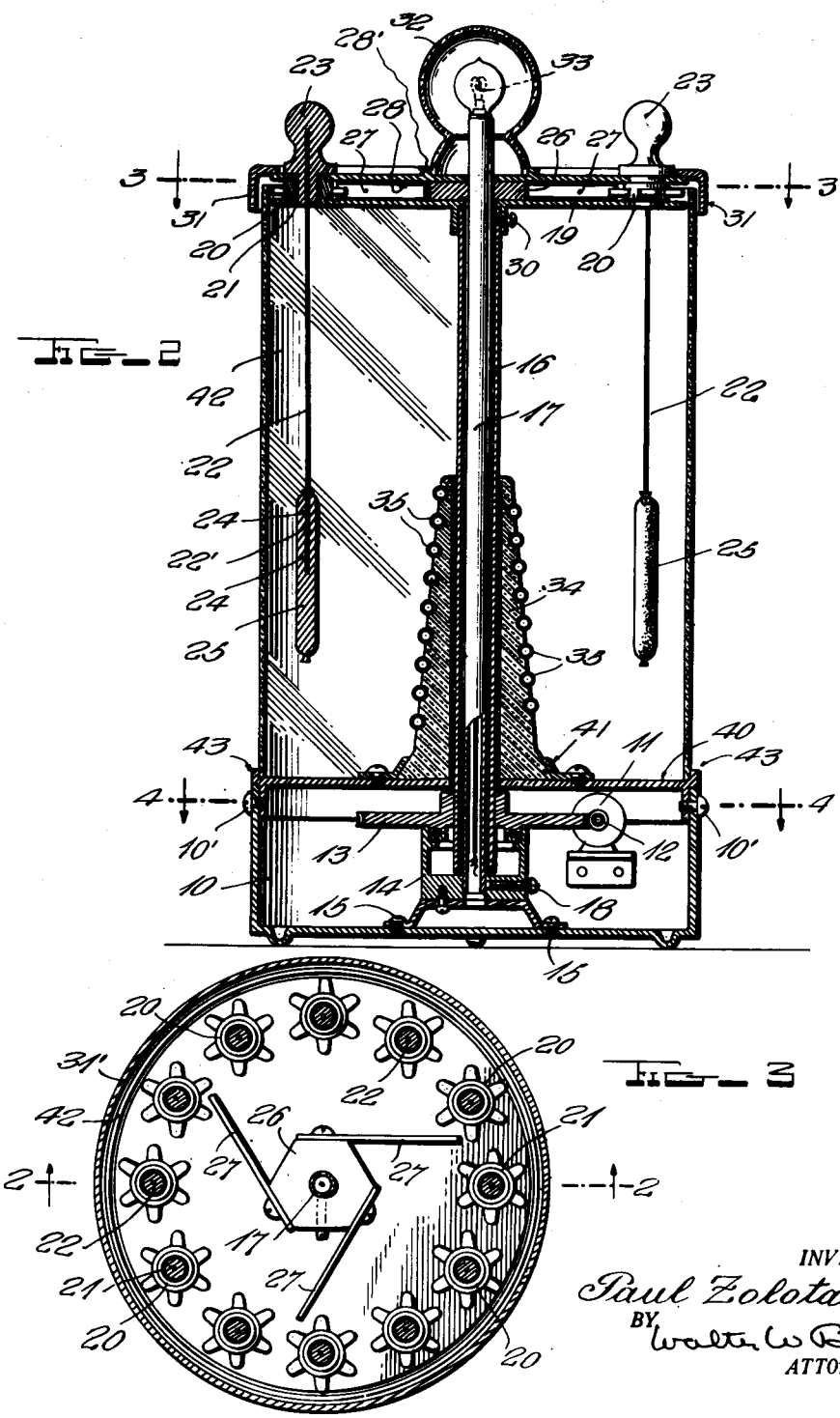

Patented Aug. 27, 1935

2,012,702

UNITED STATES PATENT OFFICE 2,012,702

BARBECUE APPARATUS

Paul Zolotas, Milledgeville, Ga.

Application November 16, 1931, Serial No. 575,329

9 Claims. (Cl. 126—41)

This invention relates to cooking apparatus and particularly to those types commonly known as barbecues.

In cooking large bodies of meat by the barbecue method of turning the meat on a spit the bodies are large enough so that the meat on one side will be away from the direct rays of the heat long enough to have an appreciable change in temperature as the spit revolves.

In the cooking of Frankfurters and similar small bodies of meat, the body is so small that difficulty has been met in obtaining the heating and relative cooking so advantageous in the barbecue method of cooking. Also in cooking small bodies of meat, there is a problem to insert and remove, with ease these small bodies.

In the present invention, it has been a primary object to avoid some of the difficulties of the past and produce a device which will cook small particles of meat with all of the advantages of larger barbecue methods.

Another object of the invention is the provision of a cooking apparatus which will have the food to be cooked readily removable and insertable.

A further object of the invention is the provision of such a cooking apparatus as will intermittently turn the food bodies so that a new portion can come into direct contact with the heat rays.

A still further object of the invention is the provision of an improved means for bodily turning the meat bodies about a center so that the operator may see all of the meat being roasted or barbecued and may select only those which are cooked the desired amount.

Other and further objects of the invention will be apparent to those skilled in the art from a reading of the complete specification and claims.

Referring to the drawings wherein I have illustrated one embodiment of my invention, Figure 1 is a front elevation of my invention showing a portion cut away for clearness.

Figure 2 is a vertical section on the line 2—2 of Figure 3.

Figure 3 is a horizontal section on the line 3—3 of Figure 2.

Figure 4 is a horizontal section on the line 4—4 of Figure 2.

The same reference characters refer to the same or similar parts throughout the specification and drawings.

Referring particularly to Figures 1 and 2, 10 designates the hollow base of the cooking apparatus in which is located a motor 11. On the end of the motor shaft of the motor 11 is a worm 12 which operatively engages a worm wheel 13. The worm wheel has a bearing on its lower face with a support member 14 which is suitably secured to the bottom of the hollow base member 10 by the screws 15. The revolving hollow shaft 16 is supported in the worm wheel 13, and turns therewith. The stationary shaft 17 is secured in the inner opening of the support member 14 against turning by the set screw 18. If desired, any other suitable drive mechanism may be provided between the motor 11 and the shaft 16.

At the upper end of the hollow shaft 16 is secured a plate 19 having openings to receive the star wheels 20. These star wheels 20 have openings 21 at their centers of sufficient size to permit passage of a Frankfurter or other piece of meat to be used with this apparatus.

This opening serves to insert the meat in a manner to be described.

There is one star wheel 20 for each Frankfurter or other piece of meat to be cooked simultaneously. For each opening 21 in a star wheel 20, there is a meat holder or spit 22. This spit is provided at one end with a handle 23 and at the other end with a roughened portion 22' which may be provided with prongs 24. The meat or Frankfurter is shown at 25. The handle 23 has a flange of such a size that it will close the opening 21 when in place. In use, the meat is secured at the end of the spit 22 on the roughened portion 22' as by inserting the spit in the end of the Frankfurter or other piece of meat. The meat and spit are then passed through the opening 21 until the handle 23 closes the opening 21.

Secured to the stationary shaft 17 is a block 26 to which are secured projections as the spring fingers 27. These spring fingers project to points where, when the star wheels 20, pass, one tooth of the star wheel passing will be engaged, thus turning the star wheel a portion of a revolution. This in turn rotates the spit and meat on the axis of the former. After the star wheel has passed the projection 27, it revolves a portion of a revolution about the center of the shaft 17 without rotating about its axis until another projection is reached. Any other suitable drive mechanism may be substituted for the fingers 27 and the star wheels 20.

On the top of the block 26 and surrounding the shaft 17 is a plate 28 similar in construction to the plate 19. This plate 28 is not secured to the stationary shaft 17 and revolves about the latter under the influence of the star wheels and the revolving plate 19 which latter is secured to the revolving shaft 16 by the screws 30.

A flanged rim member 31 rests upon the edge of the plate 28 and is easily removable for replacement of the observation glass to be described. A light globe 32 surrounds an electric light 33 which latter sets in a suitable socket at the upper end of the shaft 17. This globe 32 rests upon the top plate 28 and is held in place by the flange 28'.

Surrounding the two shafts 17 and 18 is a suitably shaped heat radiating unit which may be in the form of an insulator 34 surrounded by an electric heating coil 35. For the sake of clearness, the wiring connecting the motor, coil 35 and light 33, which is well known in the art and per se not a part of this invention, has been omitted.

On Figure 1 are indicated switches 36, 37, 38 which control the operation of the motor 11, lamp 33 and coil 35, respectively. A plate 39 is provided to give access to the motor 11 and may be secured in place in any well known manner.

The bottom plate 40 which forms a support for the heating unit 34, 35 is also the top of the hollow base 10.

A suitable flange 41 may be provided to hold the insulator 34 in proper relation to the plate 40.

In order to permit the operator to see the meat when the latter is cooking, a cylindrical casing of glass is provided as at 42 to extend from the plate 40 to the under and inner edge of the flange 31'. This cylindrical glass observation member 42 is held in its proper relation to the plate 40 by a small flange or rim 43 at the outer edge of the plate 40.

In use, the switch 38 is operated to cause the coil 35 to heat. The Frankfurters or other meat are secured to the ends of the spits 22 and are inserted as already described. The switch 36 is not operated to start the motor 11 to cause the meat to be revolved bodily about the heating device. As the prongs of the star wheel meet the projections 27, they will be turned, thus turning the spits on the latter's axis. This action gives the meat a heating and then relative cooling action which thoroughly cooks the meat and gives it an excellent flavor. If the apparatus is being operated at night, the switch 37 may be operated to light the light 33. Since the globe 32ª revolves, an advertisement may be placed thereon if desired.

When the operator observes the cooking operation to be complete, he simply removes the proper spit by the handle 23, passing the cooked meat up through the opening 21 in the star wheels 20. After removal of the meat, an uncooked piece may be placed on the spit and the operation repeated.

By this incremental rotation during the time the meat as a whole is revolving about the heater, a very satisfactory barbecue action is provided.

While I have shown and illustrated an embodiment of my invention in detail, I desire to have it understood that the disclosure is merely illustrative and that modifications and changes may be made without departing from the spirit of the invention and within the scope of the appended claims.

Having described my invention, what I claim and desire to secure by Letters Patent is:—

1. A barbecue meat cooking apparatus comprising a heating device, a spit, a top means, an opening in the top of sufficient size to permit passage of the spit and meat thereon, an enlarged portion on the spit for engaging the top means to provide support for the spit, and means for continuously bodily moving the spit relative to the heating device and means for rotatively moving the spit about its axis intermittently and independently of the bodily movement to present new portions of the meat to the heat rays of the heating device.

2. A barbecue meat cooking apparatus comprising a heating device, a meat supporting means, a top means, an opening in the top means of sufficient size to permit passage of the meat supporting means and meat carried thereby, the meat supporting means having an enlarged portion for engaging the top means to provide support for the meat supporting means and means for continuously bodily moving the meat supporting means relative to the heating device and means for rotatively moving the meat supporting means about its axis intermittently and independently of the bodily movement to present new portions of the meat to the heat rays of the heating device.

3. A barbecue meat cooking apparatus comprising a heating device, an elongated spit having a handle at one end and a meat supporting portion at the other end, a top means having an opening, of sufficient size to permit passage of the meat supporting portion and the meat carried thereby but too small to permit passage of the handle, the handle closing the opening when in place, and means for continuously bodily moving the spit relative to the heating device and means for rotatively moving the spit about its axis and independently of the bodily movement to present new portions of the meat to the heat rays of the heating device.

4. A barbecue meat cooking apparatus comprising a heating device, a casing surrounding the heating device and having transparent sides, the casing being provided with a top having openings, a plurality of meat supporting spits extending through the openings from the outside to the inside of the casing and equally spaced about the heating unit inside the casing, the openings being of sufficient size to permit passage of the spits and meat carried thereby and means for continuously bodily moving the spit about the heating device and means for giving axial rotative movement to the spit during the bodily movement.

5. A barbecue meat cooking apparatus comprising a central heat radiating device, a plurality of spits spaced around the heat radiating device, means for bodily supporting the spits, the supporting means having axially placed openings for the passage of the respective spits and meat therethrough, means for intermittently turning each spit about its axis.

6. A barbecue meat cooking apparatus comprising a central heat radiating device, a plurality of spits spaced around the heat radiating device, means for bodily supporting the spits, the supporting means having axially placed openings for the passage of the respective spits and meat therethrough, means for intermittently turning each spit about its axis and means for rotating each spit with its meat bodily about the heat radiating device.

7. A barbecue meat cooking apparatus comprising a casing a central heat radiating device within the casing, a hollow shaft within the heating unit and extending thereabove, a plurality of spits spaced about the hollow shaft, means extending from the hollow shaft for supporting the spits, motor means for rotating the hollow shaft to revolve the spits about the heat radiating device and spaced means for intermittently rotating the spits on their respective axes and means attached to the respective spits and adapted to cover openings, in the casing, of a size to permit removal and insertion of the individual spits and meat.

8. A barbecue meat cooking apparatus comprising a central heat radiating device, a rotatable hollow shaft within the heating unit and extending thereabove, a plurality of spits spaced about the hollow shaft, means extending from the hollow shaft and for rotatably supporting the spits and including a star wheel for each spit, stationary means in place to intermittently engage the star wheels when the hollow shaft is rotated and power means for rotating the hollow shaft.

9. A barbecue meat cooking apparatus comprising a central heat radiating device, a rotatable hollow shaft within the heating unit and extending thereabove, a plurality of spits spaced about the hollow shaft, a plate extending from the hollow shaft, a star wheel for each spit and having an axial opening of a size to permit passage of the spit and the meat carried thereby, a stationary shaft within the hollow shaft, means extending from the stationary shaft in position to engage the teeth of the star wheel, one at a time, when the hollow shaft is rotated and power means to rotate the hollow shaft.

PAUL ZOLOTAS.